United States Patent Office 3,021,102
Patented Feb. 13, 1962

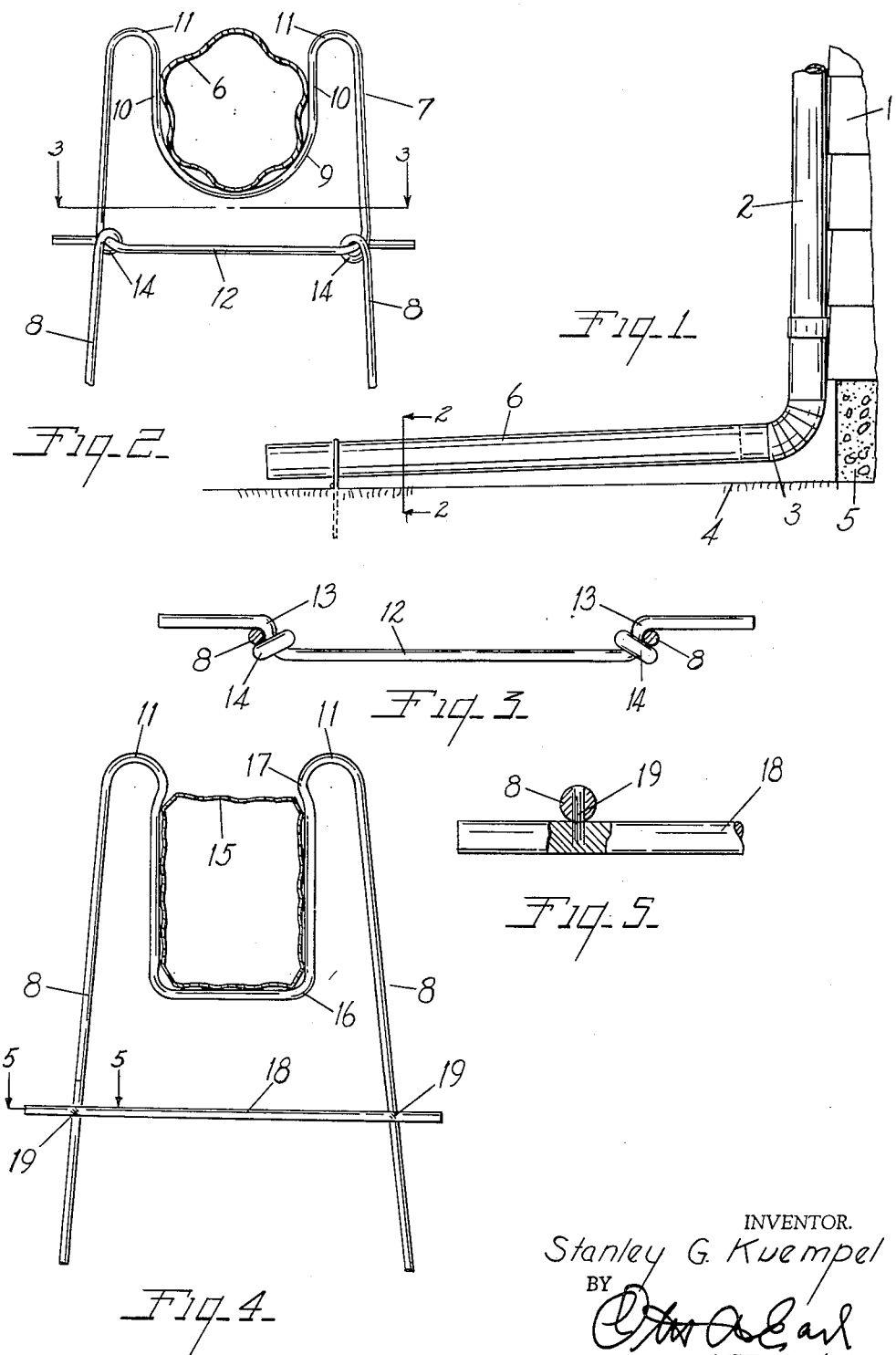

3,021,102
SUPPORT FOR DOWNSPOUTS, DISCHARGE CONDUITS AND THE LIKE
Stanley G. Kuempel, 728 E. Colfax St., Hastings, Mich.
Filed Aug. 4, 1958, Ser. No. 753,057
7 Claims. (Cl. 248—49)

This invention relates to a discharge conduit assembly for the downspouts of eavestrough and the like having laterally turned terminals at their lower ends and supports for such discharge conduits.

The main objects of this invention are:

First, to provide a discharge conduit assembly for the downspouts of eavestroughs and the like which may be easily and quickly assembled in operative relation thereto and removed therefrom and one in which the discharge conduit is effectively supported in its relation to the downspout.

Second, to provide a support member for such conduits which may be economically produced, is light in weight and quickly associated with the conduit and adapted to be handled as an assembled unit.

Objects relating to details and economies of the invention will appear from the description to follow. The invention is defined and pointed out in the claims.

A preferred embodiment of the invention is illustrated in the accompanying drawing, in which:

FIG. 1 is a fragmentary elevational view illustrating an embodiment of my invention in associated relation to a downspout and to a ground surface.

FIG. 2 is an end view of a conduit with the support member operatively associated therewith.

FIG. 3 is a somewhat enlarged horizontal section on a line corresponding to line 3—3 of FIG. 2.

FIG. 4 is a view corresponding to that of FIG. 2 of a modified form or embodiment of my invention.

FIG. 5 is an enlarged fragmentary sectional view on a line corresponding to line 5—5 of FIG. 4.

In the accompanying drawing, 1 represents a building and 2 the downspout of an eavestrough having a laterally turned discharge end 3. Such eavestroughs quite commonly discharge directly upon the ground with the result that ground may become undesirably saturated closely adjacent the wall 5 of the building. The applicant's conduit assembly is adapted to be releasably connected to such downspouts and convey the water discharge a substantial distance from the building and at the same time may be removed as occasion may require, for example, to permit mowing adjacent the building.

Applicant's structure comprises the conduit 6, the inner end of which is adapted to telescopingly engage the laterally turned end of the downspout discharge 3, as is illustrated, and a supporting and anchoring means therefor which prevents damage to the downspout such as would be likely to occur in the event the conduit 6 was swung sidewise while attached to the downspout and also to support the conduit so that it does not mark the lawn.

In the embodiment illustrated in FIGS. 1 to 3 inclusive, I provided the support member designated generally by the numeral 7 comprising spaced legs 8 connected at their upper ends by the cross member conformed into a downwardly projecting upwardly facing U-shaped seat 9 dimensioned to receive the conduit 6. The arms of the seat converging inwardly so as to retainingly embrace the conduit and desirably with some spring gripping action. The arms 10 of this conduit seat curvedly merge at 11 into the upper ends of the legs. The legs are connected below the conduit seat by the cross piece or rod 12 which has offsets 13 therein providing shoulders against which the legs 8 are seated. The legs have coils 14 therein embracing these offsets, see FIG. 3. The ends of the cross piece 12 project beyond the legs. The lower ends of the legs projecting below this cross piece to constitute ground engaging prongs. The cross piece setting upon the surface of the ground serves as a stabilizing means and also to space the conduit above the ground.

In the modification shown in FIGS. 4 and 5 the conduit 15 is of general rectangular section and the U-shaped seat 16 is conformed to embrace the sides and bottom thereof. In this embodiment the inward offsets 17 and the arms of the seat are more abrupt than in the embodiment illustrated in FIG. 2, but project above and curvedly merge into the legs 8, as in the embodiment illustrated in FIG. 2.

In the embodiment of FIGS. 4 and 5 the cross piece 18 corresponding to the cross piece 12 is secured to the legs by spot welds 19.

The embodiment shown in FIGS. 4 and 5 is somewhat more economical to produce but has less strength in the connection for the cross piece to the leg as compared to that of FIG. 2 in which the connection has the full strength of the wire from which the unit is formed. In use the assembled unit consisting of the discharge conduit and the support member is handled as a unit in engaging and disengaging from the downspout. The curved bight portion 11 presents suitable hand hold for thrusting the support into the ground and may be grasped for lifting the support from the ground.

As stated, the conduit in these described embodiments is so engaged with the support member that the assembled parts may be handled as a unit which is a matter of convenience in use and also minimizes the likelihood of loss or misplacement of the support member.

I have illustrated and described my invention in a highly practical embodiment thereof. I have not attempted to illustrate various modifications or adaptations as it is believed that this disclosure will enable those skilled in the art to embody or adapt my invention as may be desired.

Having thus described the invention what is claimed as new and desired to secure by Letters Patent is:

1. A discharge conduit assembly for a downspout of an eavestrough and the like having a laterally turned terminal at its lower end, comprising a discharge conduit releasably telescopingly and supportedly engageable with such a terminal, a conduit support member disposed adjacent the outer end of the conduit and formed of wire and comprising laterally spaced legs connected at their upper ends by a top cross piece integral therewith and having a downwardly offset upwardly facing U-shaped seat in which said conduit is disposed and springably retained, and a combined ground engaging support element and leg cross rod disposed below said seat and in upwardly spaced relation to the lower ends of the legs, said cross rod having offsets therein spaced from its ends providing leg engaging shoulders supportingly engaging the inner sides of the legs, the legs having inwardly projecting coils therein retainingly embracing the said offsets, the legs below said cross rod constituting ground engaging prongs.

2. A discharge conduit assembly for a downspout of an eavestrough and the like having a laterally turned terminal at its lower end, comprising a discharge conduit releasably telescopingly and supportedly engageable with such a terminal, a conduit support member disposed adjacent the outer end of the conduit and formed of wire and comprising laterally spaced legs connected at their upper ends by a top cross piece integral therewith and having a downwardly offset upwardly facing U-shaped seat in which said conduit is disposed and springably retained, and a combined ground engaging support element and leg cross rod disposed below said seat and in upwardly spaced relation to the lower ends of the legs and secured thereto, the legs below said cross rod constituting ground engaging prongs.

3. A discharge conduit assembly for a downspout of an eavestrough and the like having a laterally turned terminal at its lower end, comprising a discharge conduit releasably telescopingly and supportedly engageable with such a terminal, a conduit support member disposed adjacent the outer end of the conduit and formed of wire and comprising laterally spaced legs connected at their upper ends by a top cross piece integral therewith and having a downwardly offset upwardly facing U-shaped seat in which said conduit is disposed and springably retained, the arms of said seat projecting above the conduit disposed in the seat and curvedly merging into the upper ends of the legs, and a combined ground engaging support element and leg cross rod disposed below said seat and in upwardly spaced relation to the lower ends of the legs and secured thereto, the legs below said cross rod constituting ground engaging prongs.

4. A support member for a conduit adapted for use as a discharge conduit for eavestroughs and the like, and comprising laterally spaced legs connected at their upper ends by a top cross piece integral therewith and conformed to provide a downwardly offset upwardly facing U-shaped conduit seat, the arms of which have inwardly converging conduit engaging portions at their upper ends and curvedly merging into said legs above the said inwardly converging portion thereof, and a combined ground engaging support element and leg cross rod disposed below said seat and in upwardly spaced relation to the lower ends of the legs, said cross rod having offsets therein spaced from its ends providing leg engaging shoulders supportingly engaging the inner sides of the legs, the legs having inwardly projecting coils therein retainingly embracing the said offsets, the legs below said cross rod constituting ground engaging prongs.

5. A support member for a conduit adapted for use as a discharge conduit for eavestroughs and the like, and comprising laterally spaced legs connected at their upper ends by a top cross piece integral therewith and conformed to provide a downwardly offset upwardly facing U-shaped conduit seat, the arms of which have inwardly converging conduit engaging portions at their upper ends and curvedly merging into said legs above the said inwardly converging portion thereof, and a combined ground engaging support element and leg cross rod disposed below said seat and in upwardly spaced relation to the lower ends of the legs, the legs below said cross rod constituting ground engaging prongs.

6. A support member for a conduit adapted for use as a discharge conduit for eavestroughs and the like, and comprising laterally spaced legs connected at their upper ends by a top cross piece integral therewith and conformed to provide a downwardly offset upwardly facing U-shaped conduit seat, and a combined ground engaging support element and leg cross rod disposed below said seat and in upwardly spaced relation to the lower ends of the legs, said cross rod having offsets therein spaced from its ends providing leg engaging shoulders supportingly engaging the inner sides of the legs, the legs having inwardly projecting coils therein retainingly embracing the said offsets, the legs below said cross rod constituting ground engaging prongs.

7. A support member for a conduit adapted for use as a discharge conduit for eavestroughs and the like, and comprising laterally spaced legs connected at their upper ends by a top cross piece integral therewith and conformed to provide a downwardly offset upwardly facing U-shaped conduit seat, and a combined ground engaging support and leg connecting member element disposed below said seat and in upwardly spaced relation to the lower ends of the legs, the legs below said element constituting ground engaging prongs.

References Cited in the file of this patent

UNITED STATES PATENTS

| | | |
|---|---|---|
| 1,129,210 | Lenk | Feb. 23, 1915 |
| 1,367,548 | Jenkins | Feb. 8, 1921 |
| 1,596,752 | Mitchell | Aug. 17, 1926 |
| 1,831,306 | Kakimoto | Nov. 10, 1931 |
| 1,992,203 | Gabrielson | Feb. 26, 1935 |
| 2,747,823 | Swenholt | May 29, 1956 |
| 2,800,925 | Tollefsen | July 30, 1957 |
| 2,898,939 | Fox | Aug. 11, 1959 |